(12) United States Patent
Meyer et al.

(10) Patent No.: US 11,130,293 B2
(45) Date of Patent: Sep. 28, 2021

(54) METHOD FOR REVERSIBLE BONDING

(71) Applicant: ATSP Innovations, Inc., Champaign, IL (US)

(72) Inventors: Jacob L. Meyer, Urbana, IL (US); Pixiang Lan, Urbana, IL (US)

(73) Assignee: ATSP Innovations, Inc., Champaign, IL (US)

( * ) Notice: Subject to any disclaimer, the term of this patent is extended or adjusted under 35 U.S.C. 154(b) by 28 days.

(21) Appl. No.: 16/388,018

(22) Filed: Apr. 18, 2019

(65) Prior Publication Data

US 2019/0240918 A1 Aug. 8, 2019

Related U.S. Application Data

(63) Continuation-in-part of application No. 16/268,733, filed on Feb. 6, 2019.

(Continued)

(51) Int. Cl.
*B29C 65/48* (2006.01)
*C09J 167/00* (2006.01)
(Continued)

(52) U.S. Cl.
CPC .......... *B29C 65/4835* (2013.01); *B29C 43/18* (2013.01); *C08G 63/605* (2013.01);
(Continued)

(58) Field of Classification Search
CPC ... B29C 65/4835; B29C 43/18; C08G 63/605; C09J 5/06; C09J 11/04; C09J 167/00; F16B 11/006
See application file for complete search history.

(56) References Cited

U.S. PATENT DOCUMENTS 5,439,541 A * 8/1995 Economy ............ B32B 37/1207
156/182
6,773,535 B1 * 8/2004 Wetzel .................... B29C 66/43
156/247

(Continued)

FOREIGN PATENT DOCUMENTS

EP 2957610 12/2015

OTHER PUBLICATIONS

Wang et al., "Adhesion characteristics of aromatic thermosetting copolyester and glass fiber laminates with copper foils for improved circuit boards", Jun. 2016. (Year: 2016).*

(Continued)

*Primary Examiner* — Daniel McNally
(74) *Attorney, Agent, or Firm* — Adam K. Sacharoff; Much Shelist, P.C.

(57) ABSTRACT

A method of reversible bonding based on deposition of a coating capable of an indefinite number of reversible bonding cycles as enable by bond exchange reactions is provided. This is accomplished by deposition of crosslinkable aromatic polyester oligomers on a substrate. The coated article is heated to produce a fully thermoset network by condensation reactions. The fully thermoset network has access to a type of bond exchange reaction within the resin that permits the dynamic exchange of ester bonds within the resin. To execute the bonding step a source of heat is applied at a pressure. To debond, there is applied force in tension and/or shear that causes the coating to fail. The reversibility of the process is contingent on the cohesive (rather than adhesive) failure of the coating—that is, the coating must not delaminate from the substrate. Failure must occur in the resin of the reversible coating.

18 Claims, 15 Drawing Sheets

Related U.S. Application Data

(60) Provisional application No. 62/659,844, filed on Apr. 19, 2018, provisional application No. 62/627,337, filed on Feb. 7, 2018, provisional application No. 62/768,269, filed on Nov. 16, 2018.

(51) Int. Cl.
    *C09J 11/04*      (2006.01)
    *C09J 5/06*       (2006.01)
    *C08G 63/60*      (2006.01)
    *F16B 11/00*      (2006.01)
    *B29C 43/18*      (2006.01)
    *C08K 3/08*       (2006.01)
    *C08K 7/06*       (2006.01)
    *C08K 3/04*       (2006.01)

(52) U.S. Cl.
    CPC .............. *C09J 5/06* (2013.01); *C09J 11/04* (2013.01); *C09J 167/00* (2013.01); *F16B 11/006* (2013.01); *C08K 3/04* (2013.01); *C08K 3/042* (2017.05); *C08K 7/06* (2013.01); *C08K 2003/085* (2013.01); *C08K 2003/0806* (2013.01); *C08K 2201/001* (2013.01); *C09J 2301/416* (2020.08); *C09J 2301/502* (2020.08); *C09J 2400/163* (2013.01)

(56) References Cited

U.S. PATENT DOCUMENTS

| | | | |
|---|---|---|---|
| 2002/0031614 A1* | 3/2002 | Waterkamp | B05D 1/045 427/475 |
| 2005/0230026 A1* | 10/2005 | Kramer | A41D 27/245 156/73.4 |
| 2014/0154494 A1* | 6/2014 | Kato | B23K 11/314 428/300.7 |
| 2015/0290877 A1 | 10/2015 | Darland | |
| 2017/0125268 A1 | 5/2017 | Dang et al. | |
| 2018/0179421 A1* | 6/2018 | Kim | C09J 7/35 |

OTHER PUBLICATIONS

Wang, Wenging et al.. "Adhesion Characteristics of aromatic thermosetting copolyester and glass fiber laminates with copper foils for improved circuit boards." Polymers for Advanced Technologies, 2016, vol. 27, No. 12, pp. 1577-1585, see pp. 1578-1580, 1584.

Written Opinion of the ISA, PCT/US2019/028219, copending PCT Application; dated Aug. 6, 2019.

Preliminary Report on Patentability, PCT/US2019/028219, copending PCT Application; dated Oct. 1, 2020.

* cited by examiner

FIG. 1A    Table 1.

| Adhesive media | Bonding parameter | Adhesion strength | Number of cycles |
|---|---|---|---|
| funnel-shaped microstructures of polymer | Room temperature normal press | Pull off stress, 5.6 MPa | 1 |
| micropillar arrays of copolymer pDOPA-AD-MEA | Press at 25°C in water | Pull off stress, 0.004 MPa | 50 |
| Elastomers on fabric | Press at room temperature | Shear stress, 0.53 MPa | 60 |
| micro-wedge arrays of shape memory polymer | Heat at 85°C then apply pressure (0.1 MPa) until cool down to room temperature | Shear stress, 0.5 MPa | 1 |
| Plain semi crystalline cross-linked polymer | 150 or 80°C with pressure 0.136 MPa | Shear strength, 3.5 MPa | 4 |
| Epoxy with Tg over 200°C | Heat at 150°C for 20-40 min, then cool down to room temperature and keep for 24 hours (with 0.04 MPa pressure) | Pull off stress, 10 MPa | 3 |
| non-patterned epoxy elastomers | Heat at 90 for 10 min with zero pressure and then press with 0.08 MPa until cool in ambient condition | Pull off stress, 1 MPa; shear stress, 0.6 MPa | 1 |
| Micro-fibrillar adhesives of adhesive polymers and shape-memory polymers | Room temperature or 80°C with pressure up to 1.35 MPa[a] | Pull off strength, 2.7 MPa[a] | 4 |
| Thermoset epoxy with Tg of 3°C | Heat at 90°C with 0.04 MPa pressure | Pull off stress 0.6 MPa | 8 |
| furan and maleimide | Heat at 95°C for 15min and cure at 60°C for 72Hr | Shear stress, 4.56 MPa | 3 |

(a) Calculated from the values in the literature

FIG. 1C  Table 2.

| Sample No ATSP Chemistry | 1 | 2 | 3 | 4 | 5 | Average |
|---|---|---|---|---|---|---|
| C1A1 | 34.14 | 40.1 | 52.48 | 38.54 | 53.42 | 43.7±8.7 |
| C2A2 | 57.28 | 31.34 | 34.02 | 32.84 | 44.76 | 40.1±11 |
| CBAB | 44.04 | 41.14 | 47.98 | 38.02 | 44.82 | 43.2±3.8 |
| CB2AB2 | 42.64 | 51.32 | 61.18 | 60.2 | 59.32 | 54.9±7.9 |

FIG. 13B  Table 3.

| Test # | Bond conditions | | | Debond results | | |
|---|---|---|---|---|---|---|
| | Temp (°C) | Load (MPa) | Time (min) | Debond strength at 25°C (MPa) | Debond strength at T bond (MPa) | Cohesive failure percentage (%) |
| 1 | 380.0 | 28.5 | 30.0 | 20.0 | 3.1 | 89.0 |
| 2 | 380.0 | 17.1 | 15.0 | 18.5 | 0.0 | 6.0 |
| 3 | 380.0 | 5.7 | 5.0 | 20.0 | 4.6 | 99.3 |
| 4 | 340.0 | 28.5 | 15.0 | 16.6 | 0.0 | 100.0 |
| 5 | 340.0 | 17.1 | 5.0 | 12.6 | 0.0 | 100.0 |
| 6 | 340.0 | 5.7 | 30.0 | 20.0 | 4.0 | 100.0 |
| 7 | 300.0 | 28.5 | 5.0 | 0.0 | 0.0 | 100.0 |
| 8 | 300.0 | 17.1 | 30.0 | 0.0 | 0.0 | 100.0 |
| 9 | 300.0 | 5.7 | 15.0 | 0.0 | 0.0 | 100.0 |

FIG. 13C  Table 4.

| Conditions | | Results | | | |
|---|---|---|---|---|---|
| | | Debond strength at 25°C (MPa) | Debond strength at T bond (MPa) | Cohesive failure percentage (%) | Score |
| T effect | 380°C | 19.5 | 2.6 | 64.8 | 2 |
| | 340°C | 16.4 | 1.3 | 100.0 | 1 |
| | 300°C | 0.0 | 0.0 | 100.0 | -1 |
| Load effect | 28.5 MPa | 12.2 | 1.0 | 96.3 | 0 |
| | 17.1 MPa | 10.4 | 0.0 | 68.7 | 0 |
| | 5.7 MPa | 13.3 | 2.9 | 99.8 | 3 |
| Time effect | 30 min | 13.3 | 2.4 | 96.3 | 2 |
| | 15 min | 11.7 | 0.0 | 68.7 | -1 |
| | 5 min | 10.8 | 1.5 | 99.8 | 1 |

METHOD FOR REVERSIBLE BONDING

CROSS REFERENCE TO RELATED APPLICATIONS

The present application claims priority to U.S. Provisional Application Ser. No. 62/659,844 filed Apr. 19, 2013 entitled Reversible Adhesion and Interchain Transesterification Composite Welding Mechanism and is a Continuation in Part of U.S. application Ser. No. 16/268,733 filed Feb. 6, 2019 entitled Ablative Composites Based On Aromatic Thermosetting Copolyesters, which claims priority to U.S. Provisional Applications Ser. Nos. 62/627,337 filed Feb. 7, 2018, and 62/786,269 filed Nov. 16, 2018, all of which are incorporated herein by reference in their entireties.

BACKGROUND OF THE INVENTION

At a glance, space frame construction technologies have generally relied on metal-based unit elements, which are either permanently joined or connected via labor-intensive and difficult to automate joint mechanisms. Although such designs are readily used on low-orbit space missions, their large weights and infeasibility of reassembly under space conditions preclude their implementation on future space missions. To address these problems, recent studies have employed fiber composite elements attached via mechanical interlocks to lightweight, high strength/stiffness cellular structures. Even though these designs address the above-mentioned issues and present reversible joints, the length scales are currently far below those of targeted applications and joining requires complex mechanical interlocks which may inhibit a fully autonomous assembly. Present automation concepts for assembly of cellular structures involve unit members that have a relatively low packing factor and specific mechanical properties and therefore would occupy launch volume and mass needlessly.

There are several criteria for a practical reversible adhesive scheme relevant to missions in space. The first is that it be a fully reversible and all solid-state process as liquids generally have an unacceptably high vapor pressure in vacuum, which eliminates approaches that rely on uncured polymer or a meltable interstitial phase. The second is that the unit members of the structure and the reversible adhesive do not experience a glass or melt transition within the range of temperatures experienced by the structure during day/night cycles (−160 to 120° C.) in conditions without thermal controls—which would induce undesirable adhesive reversion due to an uncontrolled change in phase and negate mechanical properties of the bonded interface. This eliminates shape memory polymers and some "gecko" adhesive schemes which generally rely on polymers which have glass transitions below 120° C. Additionally, the reversible adhesive joint must be scalable and able to be implemented into complex geometries. This eliminates gecko adhesive schemes due to their reliance on patterned fibrillar surfaces. With a glass transition temperature of up to 310° C. and the entire polymer backbone possessing thermally-activated labile ester bonds and therefore the complete structure accessible as a reversible adhesive, ATSP-based adhesives present a viable and possibly unique solution to minimize mass and reduce component numbers in reconfigurable space structures. Table 1 provides a review of reversible adhesive systems available from literature.

SUMMARY OF THE INVENTION

Reversible adhesives are an attractive option for assembly and disassembly of reconfigurable space structures due to potentially lower mass needed. At present, available schemes do not address the wide temperature ranges needed for space applications. In this project, we have demonstrated that interchain transesterifications (ITR—a type of dynamic covalent exchange reactions afforded by aromatic thermosetting copolyesters (ATSP)) between two ATSP coatings can successfully be used as a reversible adhesive concept provided that the mode of debonding is completely cohesive. Coatings comprised of varying glass transition temperatures (from 170 to 310° C.) were applied to aluminum substrates and cured in a convection oven. Bonding conditions were optimized to produce complete cohesive failure repeatedly (up to 50 cycles). Additionally, we demonstrate that the high glass transition temperatures of ATSP produce high strength bonds throughout temperature ranges relevant for structural applications.

BRIEF DESCRIPTION OF THE FIGURES

A fuller understanding of the foregoing may be had by reference to the accompanying drawings, wherein.

Table 1 is a summary of experimental conditions and bonding strength results.

Table 2 is a summary of results of the thickness measurements of the lap shear test specimens. Standard deviations were calculated for each sample based on 5 independent measurements (units are in microns).

Figure 2:
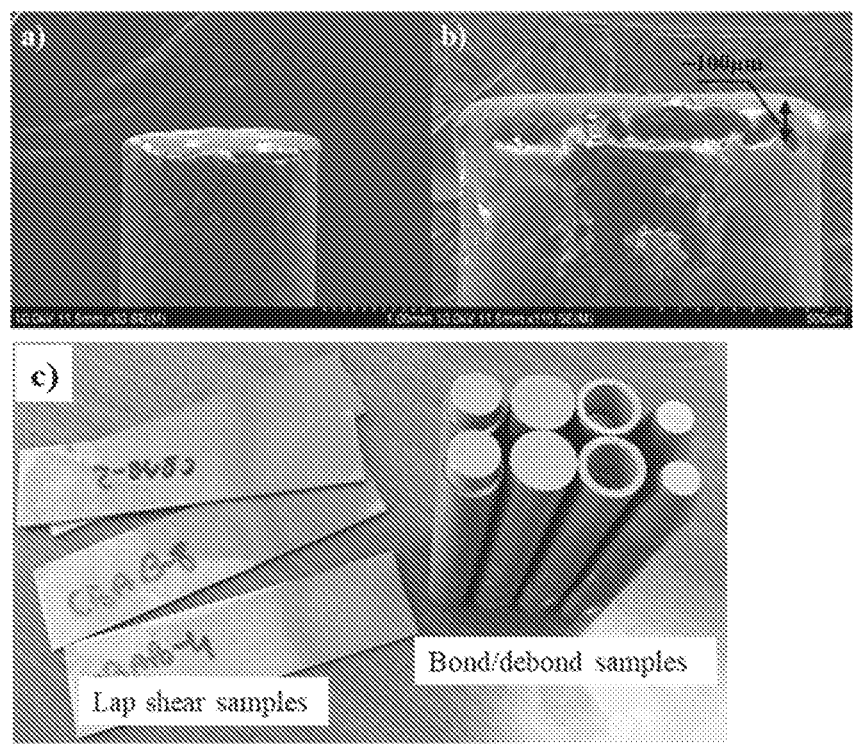

FIG. 2 shows scanning Electron Microscope (SEM) images of the ATSP coated Al specimens prepared for DMA/ITR tests. (a) uniformly formed ATSP coating layer. (b) ATSP coating thickness is about 100 μm. (c) samples for lap shear and bond/debond tests.

Figure 3:
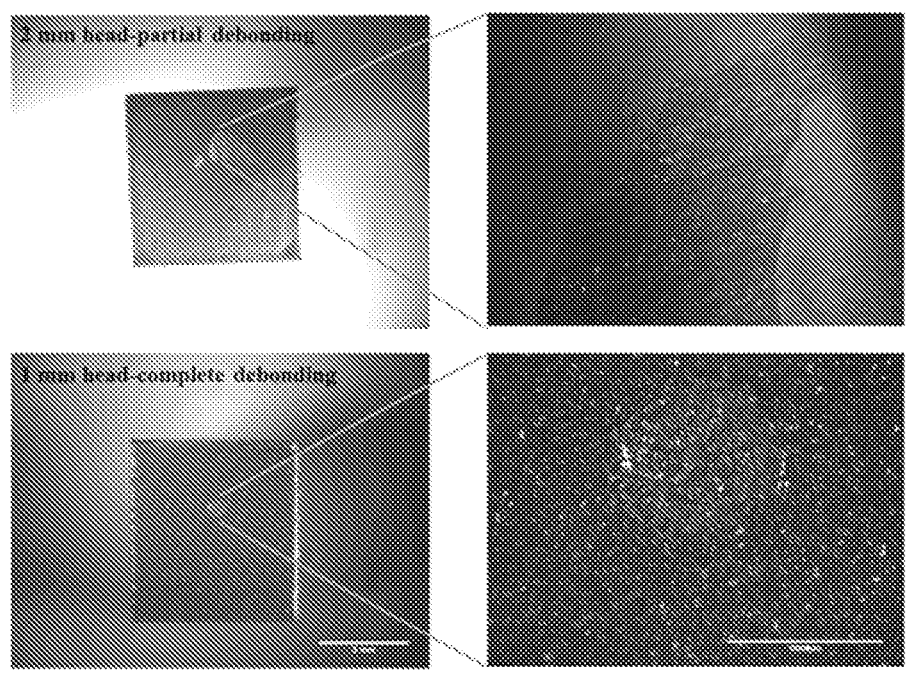

FIG. 3 shows the effects of misalignment and substrate roughness.

Figure 4:
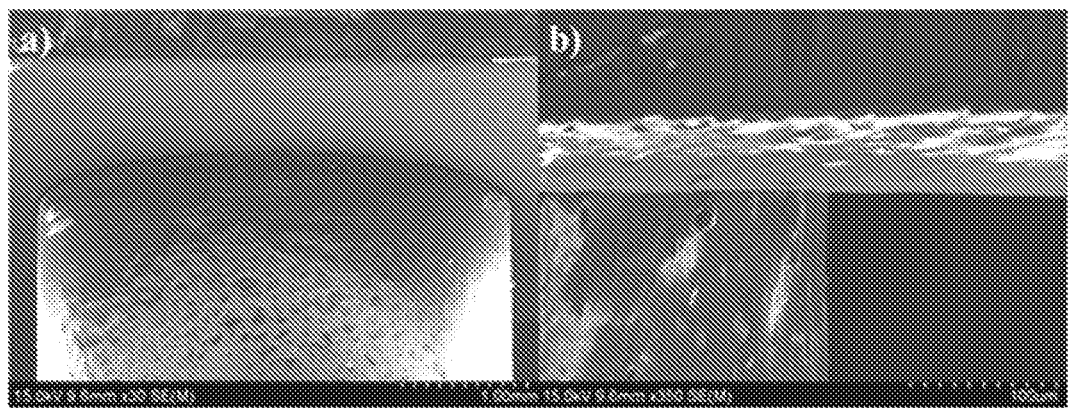

FIG. 4 is SEM images of the ATSP coated Al specimens bonded via ITR.

Figure 5:
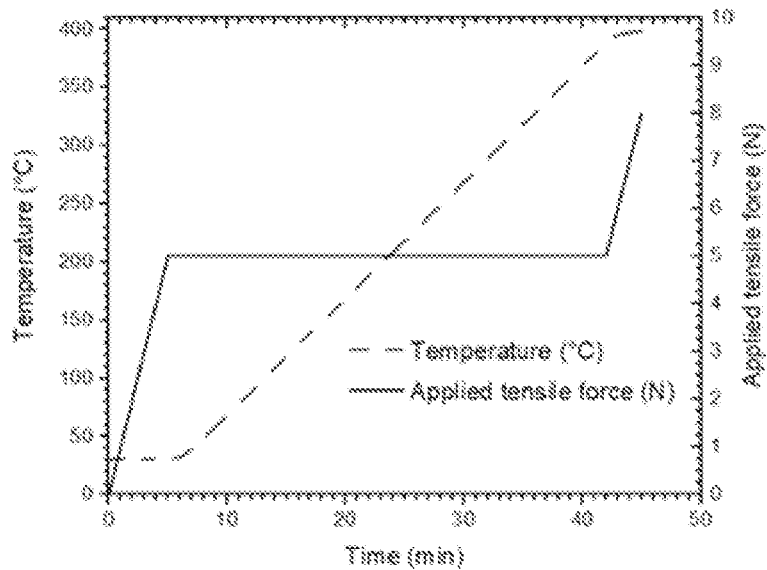

FIG. 5 shows the thermomechanical DMA cycle to enable ITR reversible debonding of the two parts.

Figure 6:
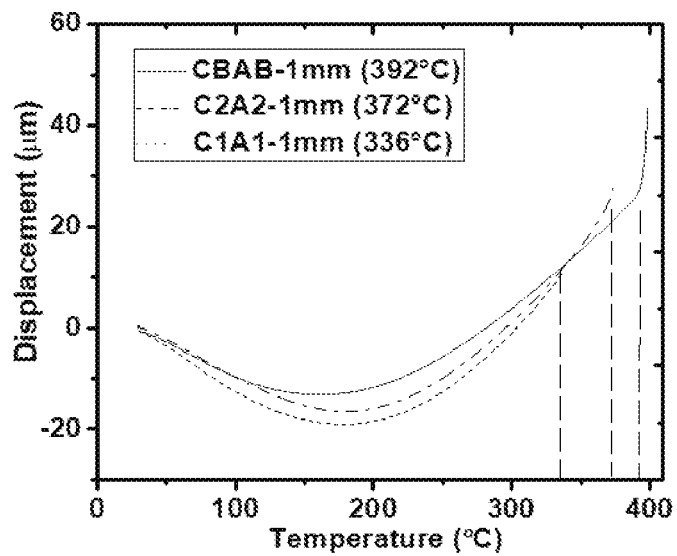

FIG. 6 is a graph of temperature versus displacement characterizing reversible debonding temperatures for the three different chemistries (C1A1, C2A2, and CBAB) of ATSP.

Figure 7:
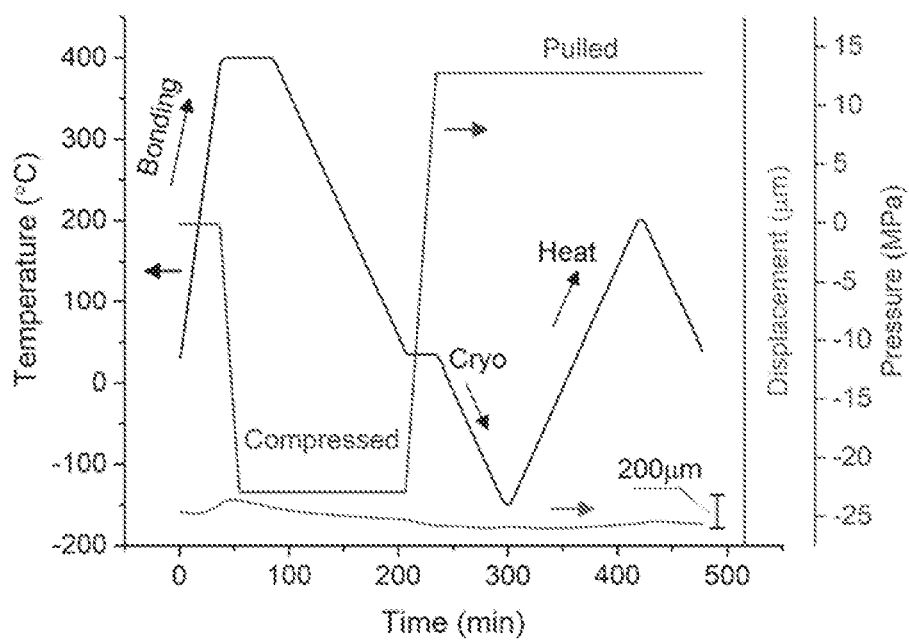

FIG. 7 is a graph of DMA thermomechanical cycle of ATSP-coated matching Al 7075 parts; first ITR bonding, second cryogenic cooling, and last high-temperature treatment.

Figure 8:
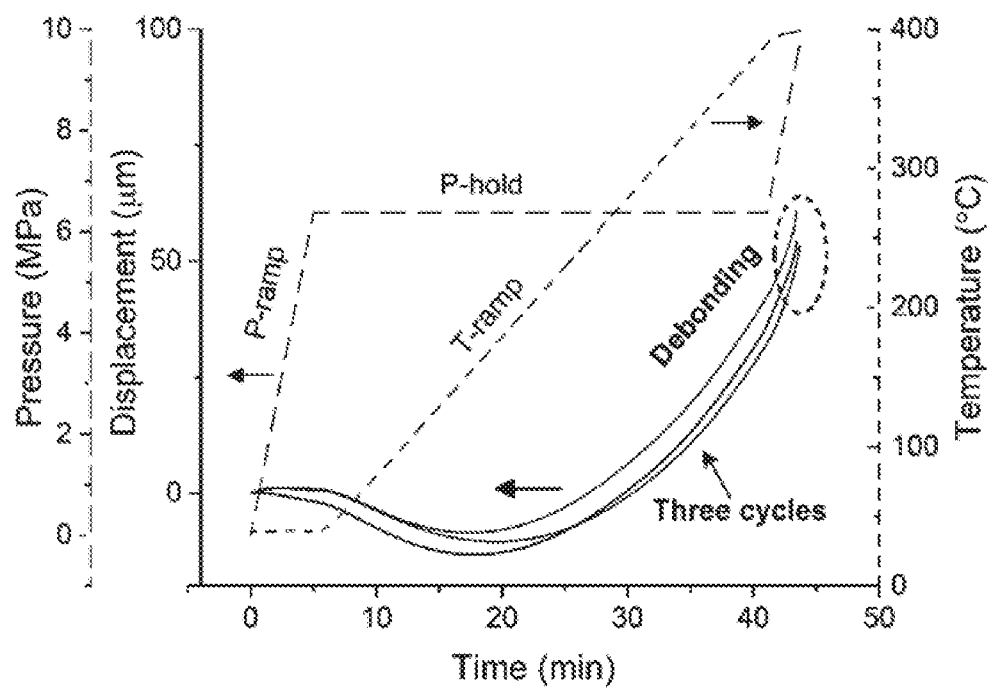

FIG. 8 is a graph of three subsequent bonding/debonding cycles in DMA on the same bonding region showing highly repeatable debonding characteristics in terms of depending displacement corresponding to close operation temperatures and effective pressure (Pressure is applied in tensile mode as tensile stress).

Figure 9:
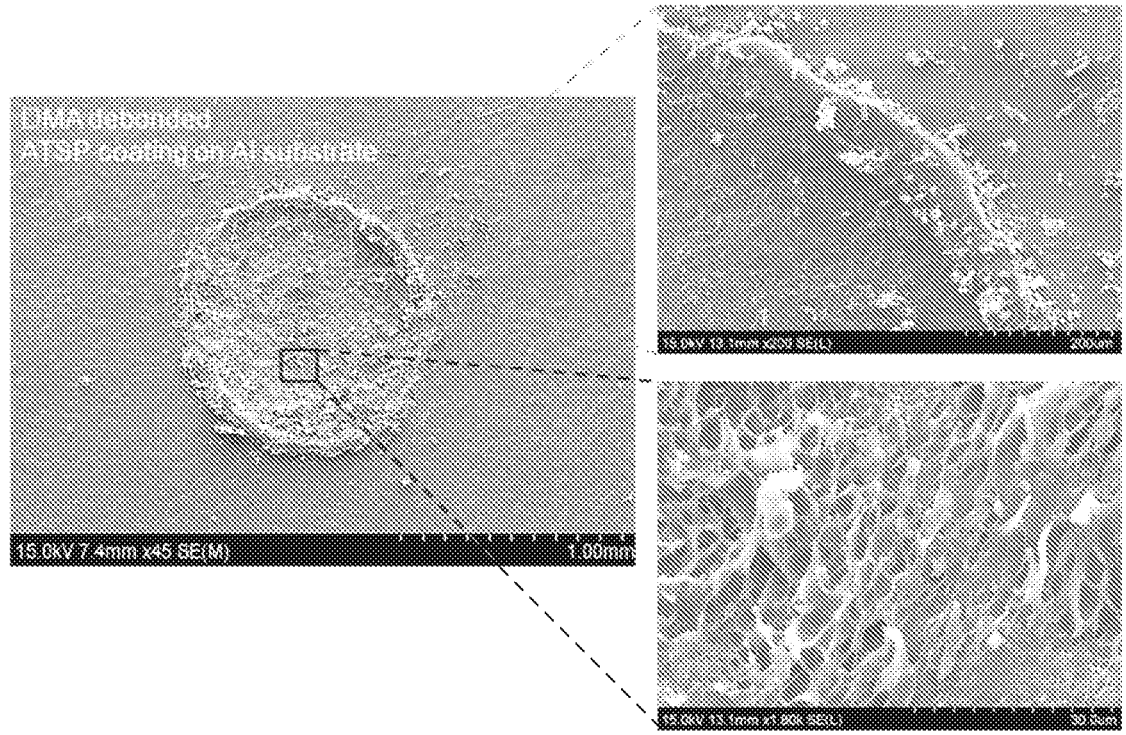

FIG. 9 shows SEM images of reversibly debonded surface with close-up views of surface features.

Figure 10:
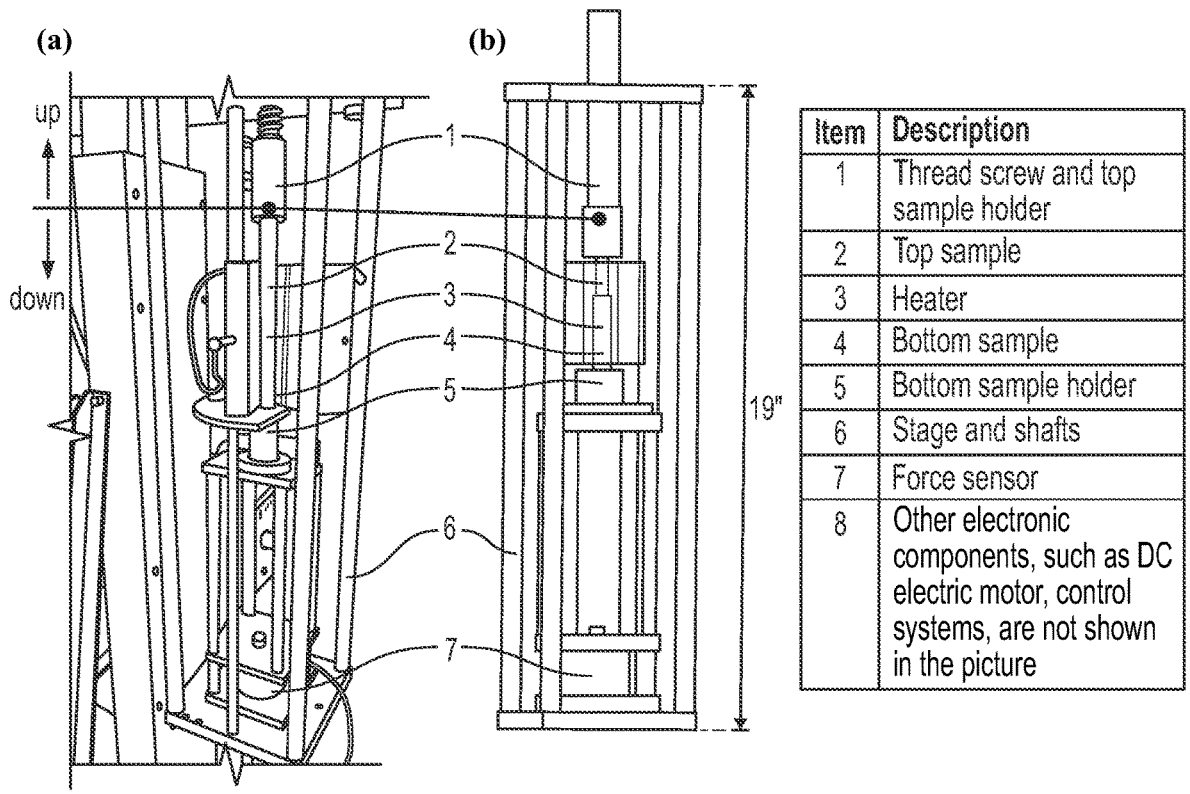

FIG. 10 is a picture and 3D design of the bond/debond toolkit.

Figure 11:
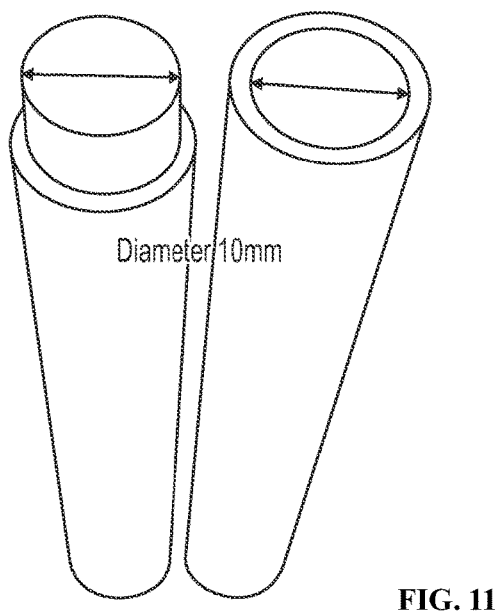
Figure 12:
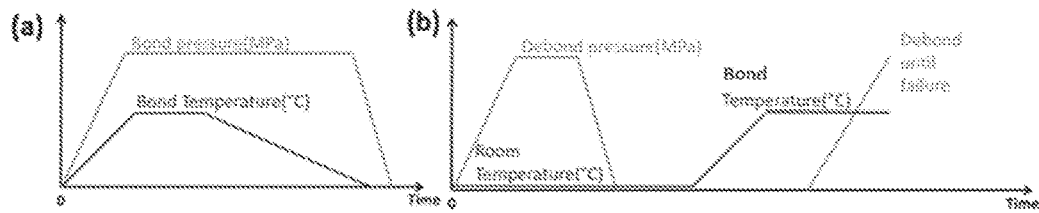

FIG. 11 is a picture of a pair of bond/debond samples with 100% of cohesive failure FIG. 12 is a schematic graph of the bond and debond process.

FIG. 13 is a real time debond force vs. time at room temperature and 380° C.

FIG. 13B shows Table 3 is a summary of the orthogonal experimental conditions and their results.

FIG. 13C shows Table 4 is an analysis of the orthogonal experiment.

Figure 14:
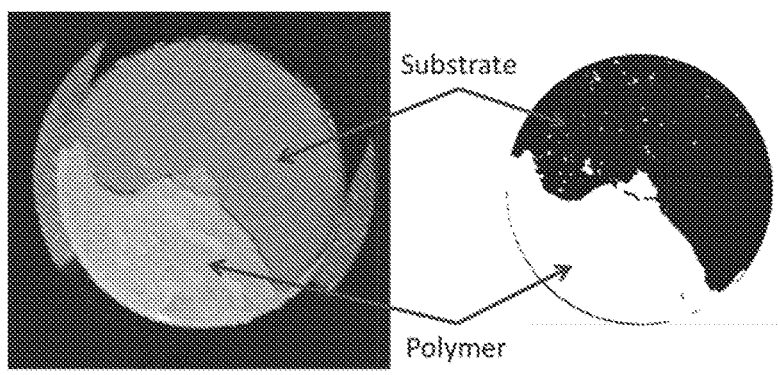
Figure 14:
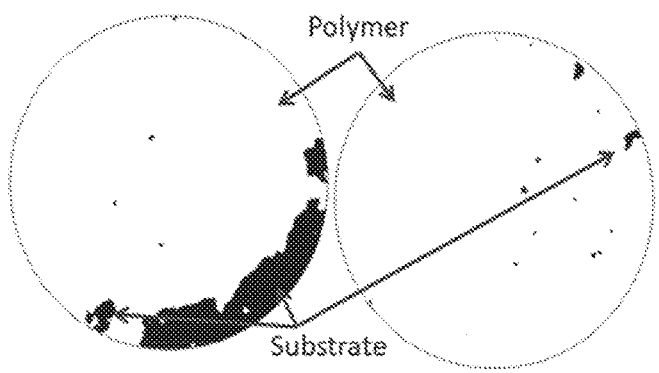

FIG. 14 is an example of failure mode analysis of UV light and the NIH 'Image' software.

Figure 15:
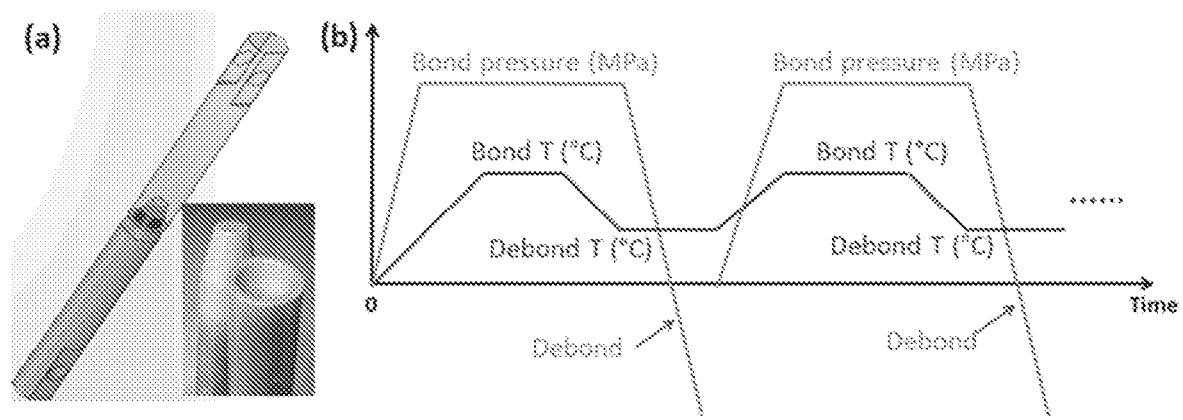

FIG. 15 is a depiction of the sample and bond/debond process over arbitrary cycles; (a) cone shape joint, (b) bond/debond process: bond at 340° C. with 5.7 MPa pressure, debond at 150° C.

Figure 16:
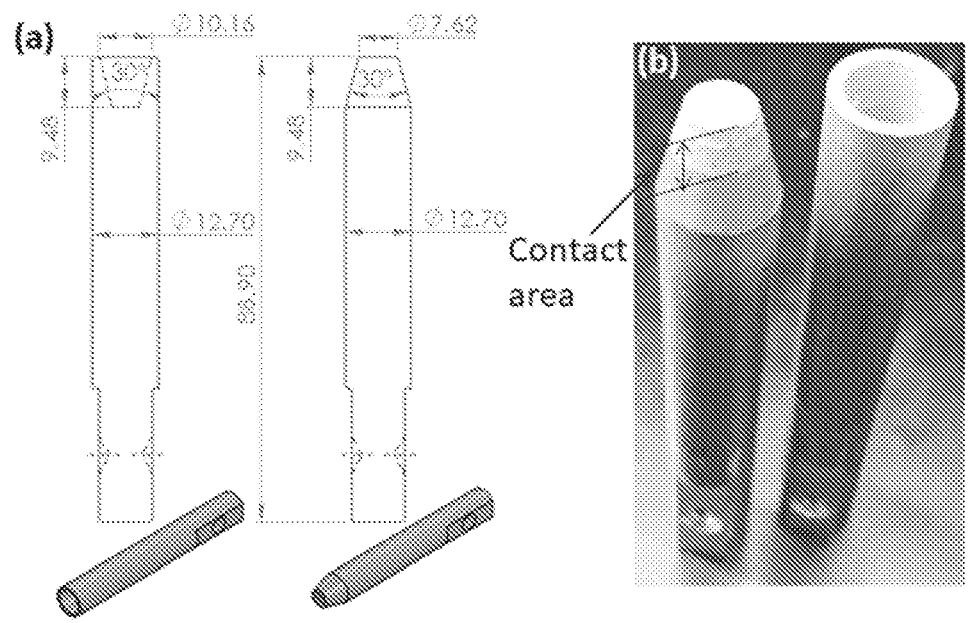

FIG. 16 is a machine drawing a picture of the self-aligning coupons coated with reversibly adhesive ATSP coating.

Figure 17:
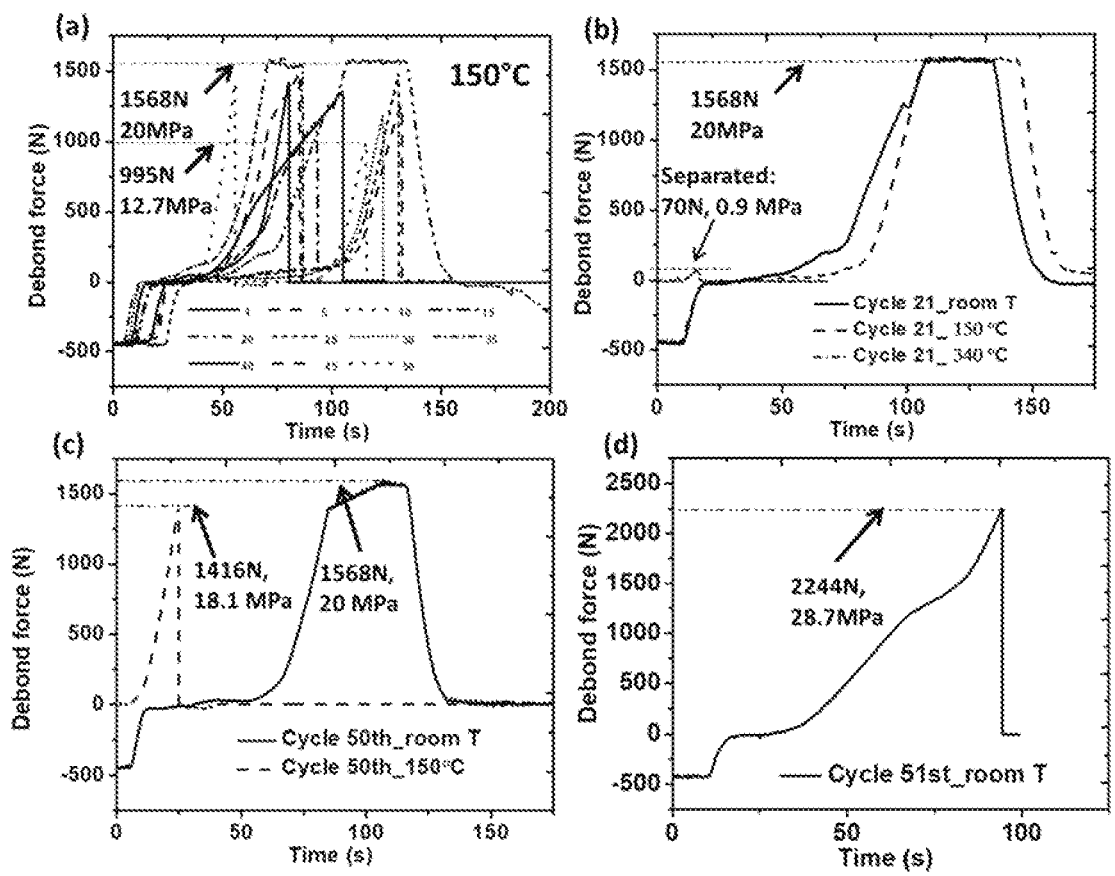

FIG. 17 is graphs of debond results, (a) 1-5-10- . . . 50th debond at 150° C., (b) 20th debond at room temperature, 150° C. and 340° C., (c) 50th debond at room temperature and 150° C., (d) 51st debond at room temperature.

Figure 18:
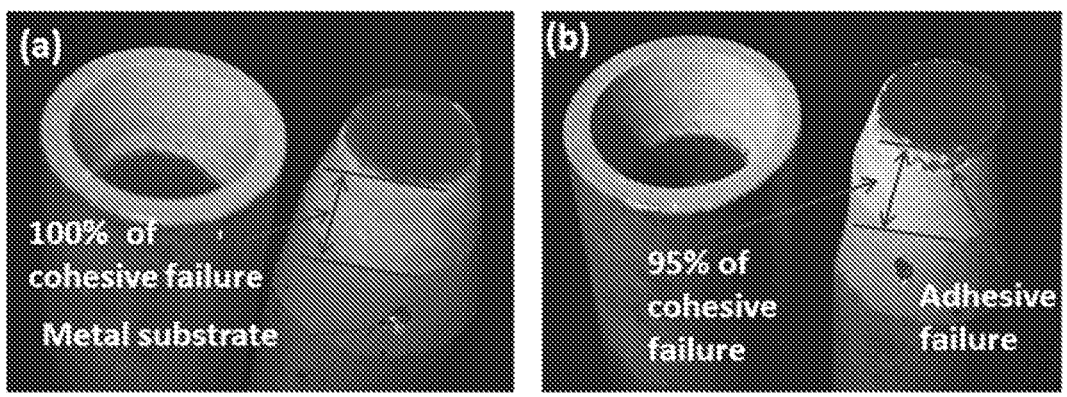

FIG. 18 is UV light image of samples, (a) after 30 times of bond/debond, and (b) after the 51st time room temperature debond.

Figure 19:
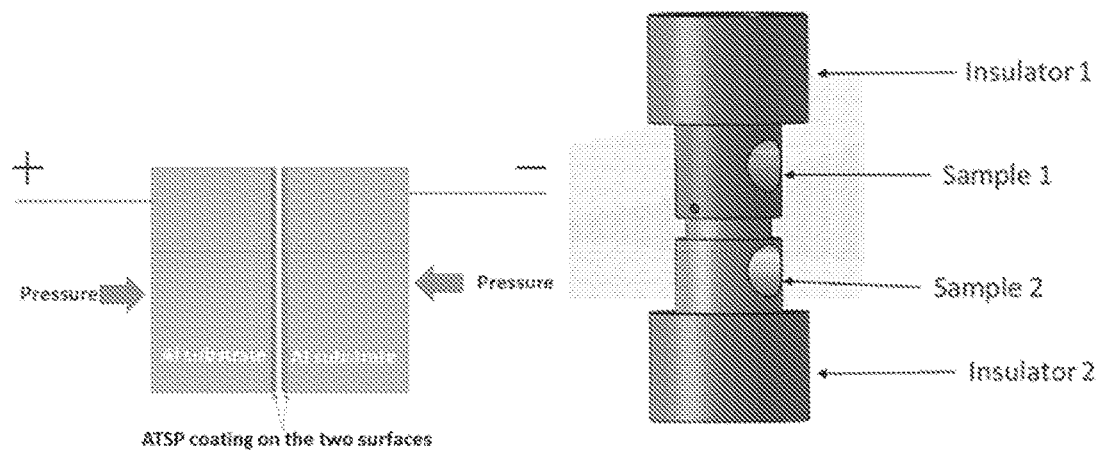

FIG. 19 shows a schematic of resistive heating scheme for ITR bonding.

Figure 20:

FIG. 20 is (Left) a picture of the resistive heating apparatus and (Right) a picture of ATSP+10% GNP articles bonded via resistive heating.

Figure 21:
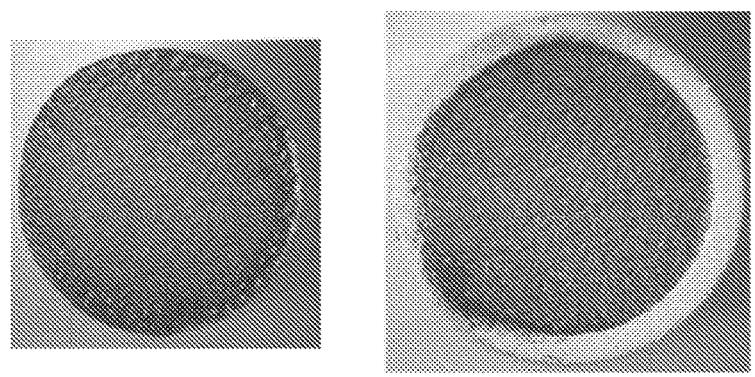

FIG. 21 is pictures of FIG. 8. Resistively bonded coupons of ATSP+10% GNP after mechanical debond at room temperature. Both sides evidence cohesive failure. Interface diameter was 10 mm (0.39").

Figure 22:
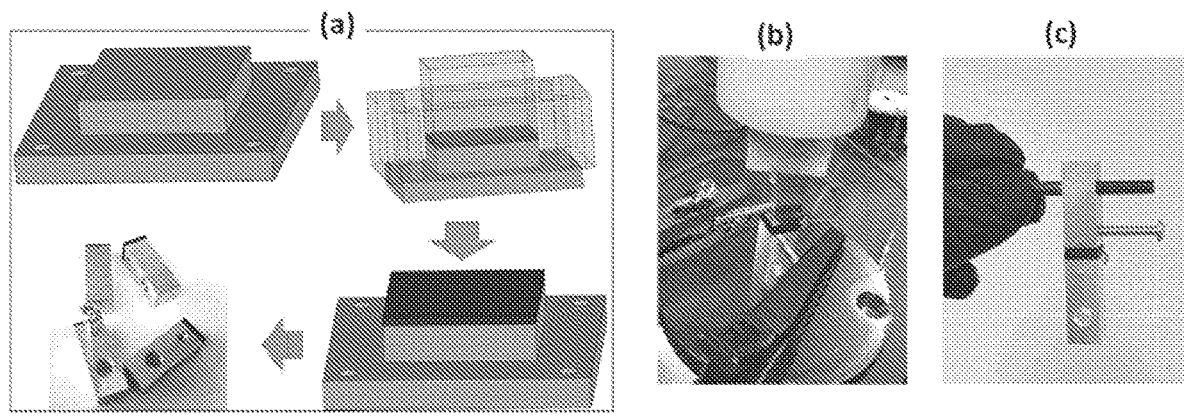

FIG. 22 shows bulk (thick section) resistive composite (CB2AB2+10 wt. % CNT+20 wt. % MCF) on 7075 A1 for reversible bond/debond, (a) sample preparation method: sandblast and coating, hot press of bulk composite on A1 sample, machine smaller coupons with composite thickness of 0.5, 1.0 and 1.5 mm (b) experimental setup for bonding, (c) bonded sample.

Figure 23:
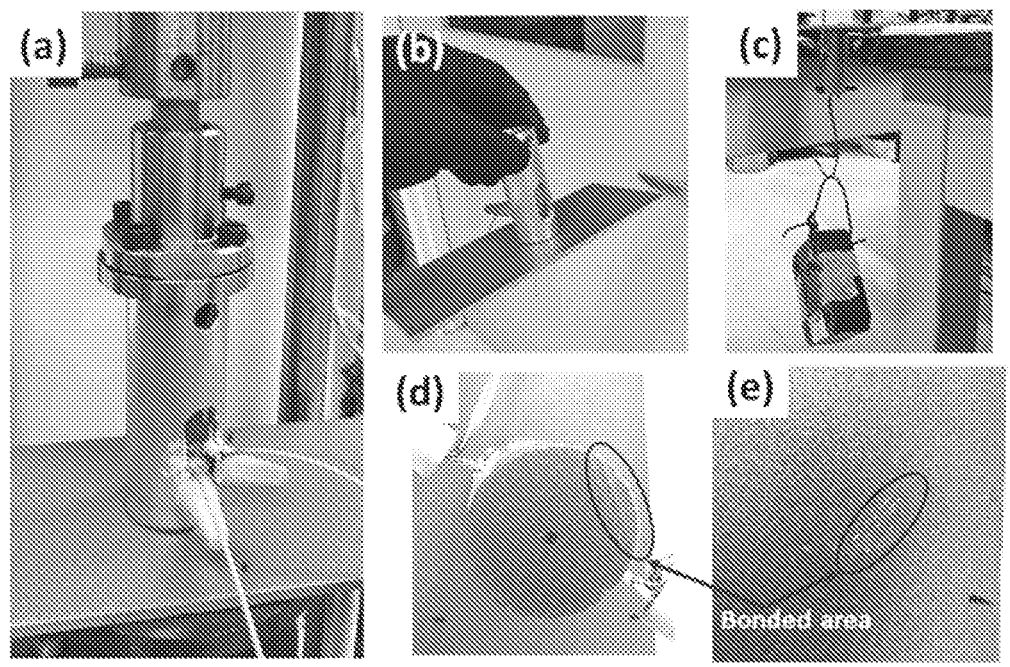

FIG. 23 shows one sample/side heating for bonding a cylinder (embed with heater) to a plain surface (aluminum coated with ATSP), (a) configuration of the cylinder attached to a plain surface, (b) bonded samples, (c) bonded samples hold dead weight, (d) open sample (cylinder) after debond, (e) open sample (plate) after debond.

Figure 24:
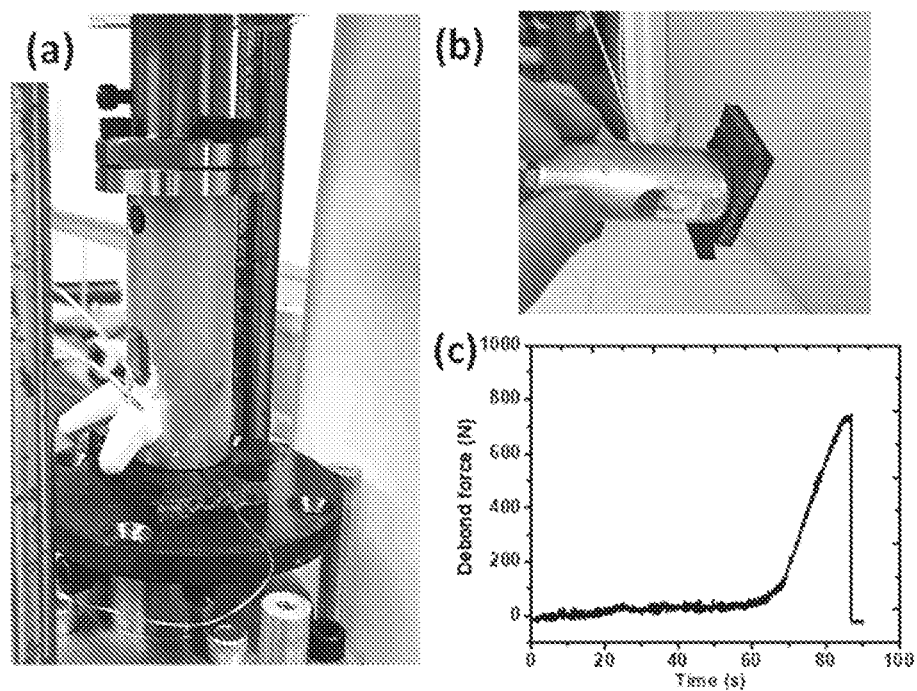

FIG. 24 shows one sample/side heating for bonding a cylinder (embed with heater) to a plain surface (ATSP—chopped carbon fiber composite), (a) configuration of the cylinder attached to a ATSP composite plain surface, (b) bonded samples, (e) de-bond curve (force vs. time) of sample.

Figure 25:
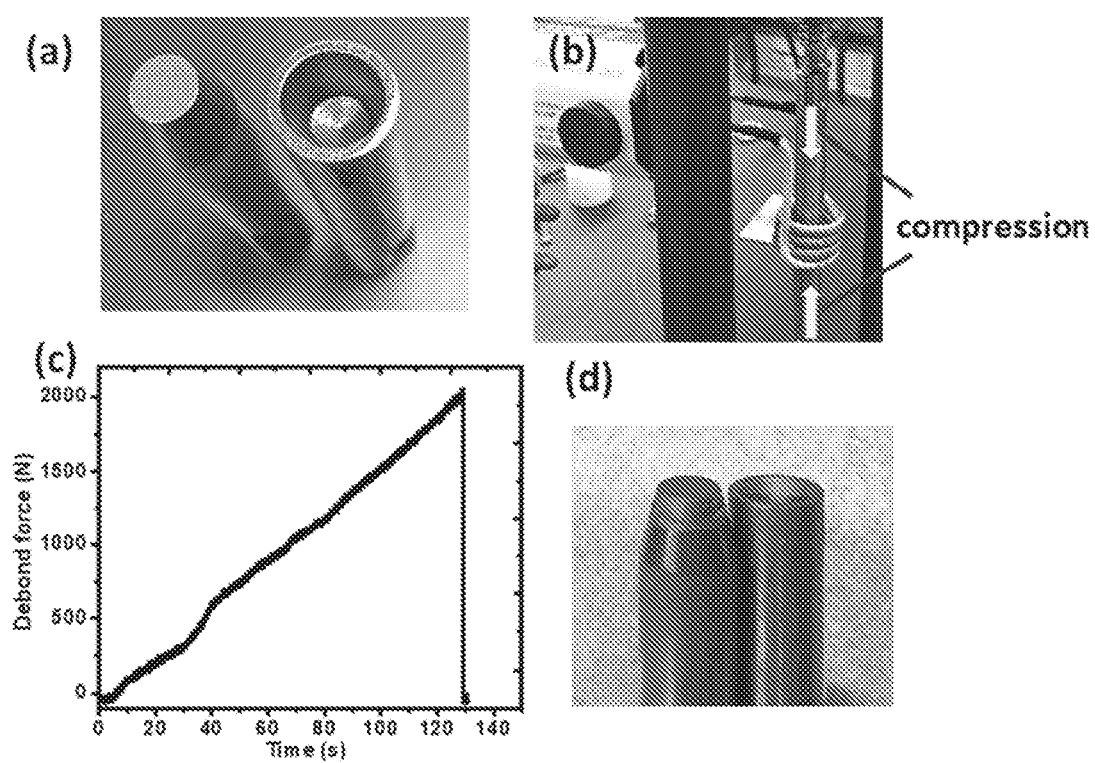

FIG. 25 shows (a) ATSP coated titanium coupons, (b) configuration of induction heating setup, (c) debond curve (force vs. time) for bonded titanium coupons, (d) samples after debond.

DESCRIPTION OF THE INVENTION

Referring now to the figures, a process is described to produce a reversibly adhesive coating capable of an indefinite number of reversible bonding cycles as enable by bond exchange reactions. This is accomplished by electrostatic powder deposition or paint spray deposition of crosslinkable aromatic polyester oligomers on a roughened metallic substrate. The coated article is heated to melt the oligomers and then produce a fully thermoset network by condensation reactions. The fully thermoset network has access to a type of bond exchange reaction within the resin termed interchain transesterification (ITR) that permits the dynamic exchange of ester bonds within the resin. Necessary to execute this bonding step of this process is a source of heat and method applying contact pressure. As well, during the debond operation, there must be an applied force in tension and/or shear that causes the coating to fail. The reversibility of the process is contingent on the cohesive (rather than adhesive) failure of the coating during debond—that is, the coating must not delaminate from the substrate. Failure must occur in the resin phase of the reversible coating. Absent the delamination, there does not appear to be a limit to the potential number of cycles that the bond/debond operation can be continued through.

EXAMPLE 1

Crosslinkable aromatic copolymer oligomers were synthesized in a batch melt polymerization in a 2 L reactor at 270° C. under an argon atmosphere with the acetic acid by-product distilled out and measured during the process. The reactions proceeded until acetic acid generation was complete. Reactant stoichiometrics were selected to provide a broad range of potential glass transition temperatures (see FIG. 2) by modification of the crosslinker density and main chain stiffness, as determined using Dynamic Mechanical Analyzer (DMA) instrument. Oligomer combinations are designated as the combination of the two oligomer sets (e.g., C1A1, CBAB, etc.). Monomers used for these oligomerizations were: trimesic acid (TMA), isophthalic acid (IPA), 4-acetoxybenzoic acid (4-ABA), hydroquinone diacetate (HQDA), and biphenol diacetate (BPDA). Biphenol diacetate was used as a stiffer and more thermo-oxidatively stable replacement for HQDA. In total, eight such syntheses were carried out to produce eight oligomer types, C1, C2, CB, CB2, A1, A2, AB, AB2. "C" oligomers were capped with carboxylic acid functional groups while "A" oligomers were capped with acetoxy functional groups. Oligomer feed ratios were (in terms of TMA:IPA:4-ABA:HQDA:BPDA) for C1 2:3:6:4:0, for C2 1:4:6:4:0, for CB 1:2:3:0:2, for CB2 1.3:5:0:3, for A1 2:2:2:7:0, for A2 1:2:5:5:0, for AB 1:0:3:0:3, and for AB2 1:1:5:0:4.

Figure 1B:
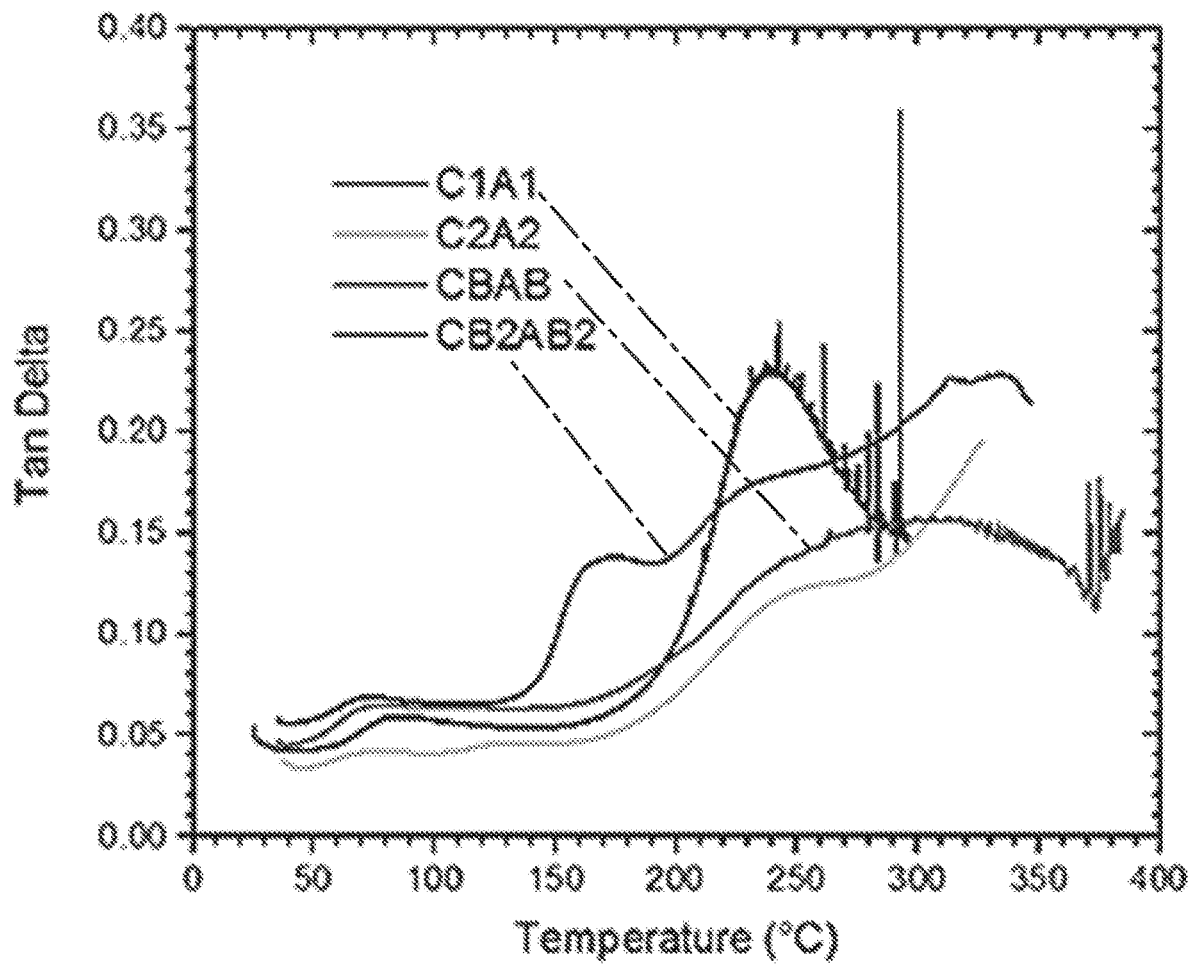
FIG. 1 shows tan delta curves of free standing cured ATSP films measured via film tension mode in DMA. Peaks in tan delta curves indicate significant changes in the available chain motions.

From the position of the peak of the tan delta curve (ratio of loss modulus/shear modulus), we identified the glass transition temperature. C1A1: 239° C.; C2A2: 250° C.; CBAB: 307° C.; and CB2AB2: 173° C., which allows us to vary this control parameter by up to 134° C., as shown in FIG. 1B.

For the coating specimens, uncured matching oligomers of ATSP were sprayed onto aerospace grade A1 7075 substrates employing an electrostatic powder technique—examples of a coated article can be seen in FIG. 2. The samples were then cured in a convection oven at 270° C. for about 30 min. Upon curing. ATSP coatings was matured to be around 40-60 μm for lap shear samples (TABLE 1) by an eddy-current-based magnetic coating thickness gauge.

Operational parameters of temperature, time and pressure for the ITR bonding were assessed and characterized via proof-of-concept Dynamic Mechanical Analysis (DMA) tests (Q800, TA Instruments). The uniaxial fixture was operated in the DMA to enable compressive force (bonding force) during the ITR process and to apply tensile force (pull-off force) during the pull-off experiments. The DMA setup is limited to ±18 N in both modes. For the DMA experiments, A1 pieces of 1 mm and 2 mm diameter circular heads (coated with ATSP) were brought in contact with rectangular bases of 10 mm×10 mm A1 pieces. Upon enabling successful ITR bonding between the two pieces, pull-off tests were applied to measure strengths of the samples. Measured pull-off strengths were beyond the limits of the DMA fixture (18 N) for both 1 mm and 2 mm diameter heads. However, larger diameter heads are more likely to see misalignment between two parts (FIG. 3), which causes partial bonding between the parts (FIG. 3—top), while a smaller diameter causes full-scale bonding (FIG. 3—bottom). As well, adhesive strength between the metal and coating is shown to be necessary. Delamination is observable in FIG. 3—top, in this case, the substrate was not roughened prior to electrostatic powder deposition whereas the example in FIG. 3—bottom has a completely cohesive (entirely through polymer) failure mode. We obtained scanning electron microscopy (SEM) images of the ITR bonded samples (FIG. 4). The samples at smaller diameter (1 mm) still evidenced bonding strength that was beyond the force limits of the DMA. To fall into the force limit of the DMA, even smaller diameters were employed, yet due to mechanical properties of the metal parts coming into effect at smaller scales, we limited the smallest diameter size to 1 mm. Overall, with results of the DMA analysis, we have observed that 23 MPa, 30 min and 400° C. enables effective ITR bonding and can be considered an effective upper bound in terms of conditions necessary for effective bonding.

FIG. 5 is an example of the thermomechanical DMA cycle to enable ITR reversible debonding of the two parts. In the cycle, the force is kept at 5N (6.4 MPa) with ramp up of temperature to 400° C.; if the bond did not break, the temperature was held at 400° C. and force was ramped up to 18N. FIG. 6 is the in-situ displacement vs. temperature reversible dehorning for three different chemistries (C1A1, C2A2, and CBAB) of ATSP, where the debonding temperatures at 5N are 336° C., 372° C. and 392° C. for C1A1, C2A2, and CBAB, respectively. The high bond strength is well demonstrated at room and high temperature, however in space the temperature can range from cryogenic to high temperature. Thus, as shown in FIG. 7, a static load study was carried out from −150° C. to 200° C. and the results show that the bond strength is well maintained (~13 MPa) throughout this temperature range. This example demonstrates that the process described can produce a high mechanical strength adhesive bond in the solid state as enabled by bond exchange reactions.

EXAMPLE 2

Following the process from Example 1, three consecutive cycles of reversible ITR bonding/debonding were successfully performed over the same bonding area using uniaxial loading fixture in DMA as shown in FIG. 8. The ITR cycles demonstrated quite repeatable trends with respect to displacement over the bond line at the given temperature and tensile stress (pressure) which effectively validates the reversibility concept of the ITR bonding. Another major finding is that the debonding, or reversibility, occurred in cohesive mode as the corresponding surface on the base substrate still contained polymer coating. As seen in SEM (Hitachi 4800) images in FIG. 9, the applied ATSP coating remained on the metal substrate surface. Fracture surface clearly shows the evidence of ductile failure mode—fibrillation/drawing is clearly evident in the lower right close-up image, as compared to surface features of fractured specimen at room temperature. Note the concave appearance was formed due to the extremely high bond temperature (400° C.). This example demonstrates that reversible bonding is achievable using the process described provided that there is no delamination of the coating from the substrate.

EXAMPLE 3

Due to the limited force range available in the TA Instruments Q800 DMA as compared to the very high pull-off strengths obtained during these experiments, a specifically developed reversible bonding toolkit was implemented, as shown in FIG. 10. Debonding is a necessary step for demonstration of ITR reversible bonding; however, the force required for debond can be very high, for example to separate a 10 mm diameter bond at room temperature with a pull-off strength of 30 MPa, the force would need to be 2355N. Hydraulic systems are widely used for high force applications, but hydraulic power is not applicable for in-space conditions. Thus, an electric motor with the lead screw/nut was used to supply force to the press and pull for reversible adhesion application. FIG. 22 shows a 3D diagram for the bond/debond toolkit with the main parts being: 1) stage and shafts, 2) lead screw/nut, 3) sample holders. 4) & 5) top and bottom samples, 6) heater, 7) force transducer, and 8) other electrical parts such as DC electric motor and control system, not shown in the schematic.

With help of lead screw/nut (2), the motor's rotation (8) can move the top sample (4) up and down and can have the positions of contact with bottom sample (5) at the target bonding force and also debond the samples. The force transducer (7) can measure the applied load between the two samples, and also give feedback signal to motor to rotate and achieve target force. The heaters (6) behind the samples enable high temperature bond/debond tests, while the long shafts (1) isolate the high temperature parts in the middle and protect the other parts from high temperature.

Figure 13A:
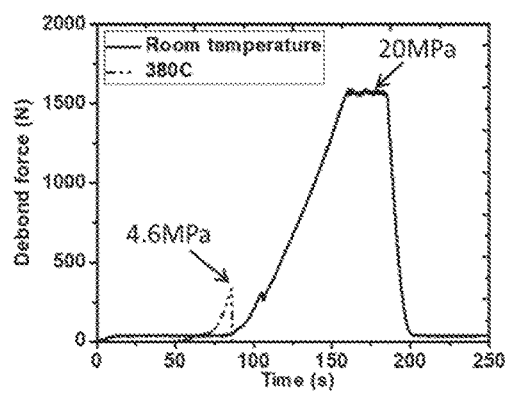

CB2AB2 was chosen for the remaining experiments since it displayed the highest lap shear strengths in the las shear tests. FIG. 11 shows the CB2AB2 coated samples of the bond/debond toolkit after debonding, and the contacting area is a circle with 10 mm diameter (78.5 mm2). Because of a larger area of contact, the thickness of the coating had almost zero change before bond and after debond, with only the flatness of the peaks of the coating after debond. FIG. 13 shows the bond/debond process parameters. In FIG. 12(a), the temperature increases from room temperature to the target temperature, holds for a specific bond duration, and then cools down to room temperature; the force increases from 0 to target bonding pressure at very beginning, and then holds the pressure until the sample cools down to room temperature. FIG. 12(b) shows the debond process, first debond happens at room temperature while ramping to reach the maximum pull-off force of 350 lbs (20 MPa), if the samples fail before this force, stop the test; if the samples can survive, decrease the load to zero, and increase temperature to bonded temperature, then test the debond until the samples' failure. FIG. 13A is a real time debonding process at room temperature and 380° C.: the room temperature debond strength went up to 350 lbs (20 MPa), and the 380° C. debond strength was 77 lbs (4.4 MPa).

Nine different ITR parameter combinations (instead of all 27) were examined according to the orthogonal experimental design, as shown in Table 3. Three experimental parameters, namely temperature, load and time were examined for this parametric study; and there were three different level values for each parameter: three different bond temperatures (380° C., 340° C. and 300° C.), three different bond loads (28.5 MPa, 17.1 MPa and 5.7 MPa), and three different bond durations (30 min, 15 min, and 5 min). Results of the tests are shown on the right side of Table 3, and we list three different parameters (debond strength at room temperature, debond strength at bond temperatures and cohesive failure percentage) to evaluate the results. As for calculation of the cohesive failure percentage, an ultraviolet (UV) light source was used to determine the failure mode: with UV light, the adhesive failure part with substrate exposed has darker color and other areas with polymer coverage has a lighter color, as shown in FIG. 14—top of a debonded sample under UV light and the analysis. Because the adhesive failure could happen on both samples, as shown the black area (adhesive failure) in FIG. 14—bottom, thus we need to add all the dark areas on the two samples for adhesive/cohesive failure percentage calculation.

Table 4 shows the analysis of the orthogonal experimental results: each of the values in the table was the average of three experiments carried out with that specific condition. For example, the load effect values of 28.5 MPa in Table 4 was the average values from test numbers 1, 4, and 7, which all have the same bond pressure of 28.5 MPa. The last column in the table shows a score that relates the average values: the highest value for each condition received one point; each zero would subtract one from the score. As for temperature effect, 380° C. has the highest debond strength at 25° C. and bond temperature, however, it has smallest cohesive failure percentage which is detrimental for reversible adhesion applications; 340° C. has both good bond strength and 100% cohesive failure. As for load effects, 5.7 MPa has the highest strength and cohesive failure. Regarding the bond time duration, 30 min produces the highest strength and very high cohesive failure percentage. Thus, according to the parameter levels listed in current Orthogonal experiments and considering reversible adhesion and bonding strength, the combination of 340° C., 5.7 MPa and 30 min will produce the best results. Note that even lower pressure of bonding process should be also evaluated in future.

EXAMPLE 4

Following from the conditions described in Example 3, and to carry out proof of concept of bond/debond multiple times, we designed a cone shape joint structure that has surface contact area of 78.2 mm2, as shown in FIG. 15(a) and FIG. 16 (with more detail of dimensions). The experimental process as shown in FIG. 15(b) was repeated 50 times, with experimental parameters: bond at 340° C., 5.7 MPa and hold for 15 min (1st to 35th experiment) or 7 min (36th to 50th experiment). The shorter times (not 30 min from orthogonal analysis) for the bonding process was due to time constraints. After the bonding process, test the structure strength by debond until cool down to 150° C. Additionally, for the 20th and 50th experiment, bond with same parameters; to verify the bond strength at different temperatures, the joint was debond with load up to a maximum force of 1568 N (350 lbs.) at room temperature, 150° C. and 340° C. (if not debond, reduce the force to zero, heat it up to next stage and do debond up to 1568 N at the higher temperature stage). Results are shown in FIG. 17 with the debond curves of the cone surface joint. FIG. 18(a) is the result of 11 experiments out of the total 50 experiments, and the average debond force is 1280±225N (16.3±2.9 MPa, with minimum of 995 N and maximum of 1568 N), which is a very high force for a joint with such a small contact area. As shown in FIGS. 17(b) and (c), for the 20th and 50th experiment, both of the debond strength reached a minimum force of 1568 N (20 MPa) al room temperature (without break); at 150° C., the 20th cycle still reached a strength of 1568 N, while the 50th cycle reached 1417 N (this was due to the different hold time: 15 min for 20th cycle and 7 min for 50th cycle); at 340° C., the 20th cycle debonded with a very small force of 74 N (0.95 MPa), which will enable a low debond force if debond at 340° C. in future real applications. Another important finding is that the surface was 100% cohesive failure after 30 times of bond/debond, as demonstrated in FIG. 18(a); after 51st debond at room temperature, which is much more aggressive than 150° C., there are two spots of adhesive failure on the top of the cone (with 95% of cohesive failure), as shown in FIG. 18(b). Moreover, during the 51st cycle of bond/debond, the joint is able to reach a debond force of 2244 N (501 lbs, 28.7 MPa) at room temperature (and therefore yielding a higher strength value than the debonds conducted at 150° C.), thus we can determine that the debond strength does not degrade. These 51 cycles of bond/debond testing definitively prove the concept of reversible adhesion using interchain transesterification.

EXAMPLE 5

Prior studies have shown that ATSP coupled with carbonaceous fillers (milled carbon fibers [MCF], carbon nanotubes [CNT], and graphene nanoplatelets [GNP]) can produce relatively high electrical conductivities. In this reporting period ATSP and a conductive carbonaceous phase was coated onto several target coupons as in FIG. 19 (Right) on aluminum substrate.

In this method, coated surfaces were brought into contact with each other with applied DC current (which will force Joule heating on the less-conductive ATSP/C bondline) to induce the ITR adhesive conditions. FIG. 19 shows a schematic of the process. Pressure was applied along with DC current such that the coating temperature increased via Joule heating.

Compositions were selected to examine appropriate resistivity for the application coupled with the need for a coating morphology that offered appropriate mechanical strength. Four coatings within this space were initially examined. Two coatings (CB2AB2+4 wt % M5 GNP [5 um GNP diameter] and CB2AB+4 wt % M25 GNP) offered good mechanical integrity but had resistance in the $10^6 \Omega$ range, which was too high for practical use in this application. CB2AB2+10 wt % M5 GNP had poor coating quality but potentially acceptable resistance. CB2AB2+10 wt % M25 GNP had acceptable coating quality and roughness and offered resistances in the range of hundreds of ohms for coatings of 30-50 um (1-2 mils). Apparatus to bond via Joule heating and measure temperature is shown in FIG. 20 as well as bonded specimen. Following mechanical debond of bonded specimens, it can be seen (as in FIG. 21) that the resistively bonded area can evidence a 100% cohesive failure, thereby enabling reversible bonding as described above.

EXAMPLE 6

In this example, we used a thicker section of ATSP composite for the resistive heating method. FIG. 22(a) shows the sample preparation process for the bulk (thick section) resistive composite on flat 7075 Al substrate: 1) produce a 7075 Al substrate, sandblast for the substrate to increase the bonding strength, then deposit a coating layer with same composition as the bulk composite, 2) assemble the coated sample with the hot press mold and load the uncured composite in the mold, 3) take the cured sample out and then machine smaller coupons (8.9 mm square surface, with different thickness) out of the cured sample. FIG. 22(b) is the experimental setup for bonding, the two coupons are connected with the two-power supply ends respectively, and the thermocouple is inserted in the tiny hole on the negative power side. By supply of a normal load of 4 MPa and voltage of 30V, the outcome current is 2.5 A and the power is 70 W; this experimental parameter can bond the sample in about 1 min, at the time, the near contact temperature is about 140° C. FIG. 22(c) shows the bonded sample.

EXAMPLE 7

In this example, we demonstrate that embedded heating elements can be used to provide conditions applicable for ITR-based bonding. FIG. 23(a) shows an ATSP coated aluminum cylinder that is embed with heating wire that is contacting with a flat aluminum surface with ATSP coating. At an applied pressure of 1.7 MPa, temperature of 360° C., and 5 min duration at temperatures of 360° C., when the samples cool down and release the pressure and the normal pressure is released, the two samples are bonded together, as seen in FIG. 22(b). And FIG. 23(c) shows that the bonded sample is holding a dead weight of 3 kg. FIGS. 23(d) and (e) shows the samples after break, the simples are only partially bonded because the cylinder surface was not well machined and thus only partial contact was achieved.

FIG. 24(a) shows an ATSP coated aluminum cylinder embed with heating wire that is contacting with a flat ATSP—chopped carbon fiber composite (30 wt % of carbon fiber). With compressive pressure (0.85 MPa), heat (360° C.), and 5 min duration at temperature of 360° C., when samples cool the pressure is released and the two samples are bonded together, as seen in FIG. 24(b). And FIG. 24(c) shows that the force vs. time debond curve of the two samples, it had a 744 N debond force, corresponding with 1.51 MPa debond pressure. Compared with above ATSP coated aluminum surface, the carbon fiber composite is more flexible and had higher thermal insulation properties, thus, it was easier to heat the samples to 360° C. and the contact is more uniform.

EXAMPLE 8

In this example, we demonstrate use of induction heating as a heat source for the bonding operation. Using a induction heater (Induction Innovations MB-700 Mini Doctor II Magnetic Induction Heater Kit), and placement of the joint of the two coupons in the induction coil, we applied j compressive force (355 N, corresponding to 4.5 MPa pressure), as shown in FIG. 25(b) following this, the induction heater was turned on for 40 sec, allowed to cool for 20 sec, then release the coupons from bonding stage at which point they were well bonded. FIG. 4(c) is the debonding curve (force vs. time) for the bonded titanium coupons at room temperature, and it showed a maximum debond force of 2046N (corresponding to 26 MPa), which is similar as previous data with aluminum substrate. This non-contact induction heating method is far more efficient compared with either embedded heating method or clamshell radiant heating.

In various embodiments in the present invention there is provided a method of adhesively bonding at least two substrates. The method includes the steps of:
 a. preparing a crosslinkable resin deportable by electrostatic powder deposition, and wherein the crosslinkable resin possesses exchangeable bonds within the crosslinkable resin after curing;
 b. depositing the crosslinkable resin by electrostatic powder deposition onto substrates to define crosslinkable resin coated portion of the substrates;
 c. bonding the crosslinkable resin coated portions of the substrates by abutting the crosslinkable resin coated portions of the substrates to each other and applying a compressive pressure in the range 100 kPa to 20 MPa at an elevated temperature in the range of 150° C. to 420° C. such that the crosslinkable resin coated portions of the substrates' crosslinks with itself across the crosslinkable resin coated portions of the substrates to create a bonded cured resin surface; and
 d. wherein the bonded cured resin surface possesses at least 4 wt % exchangeable sites within the crosslinks of the bonded cured resin surface.

In addition, the adhesively bonded substrates can include the steps to debond the substrates such to provide for rebonding. This may include the step of debonding the bonded cured resin surface by tensile and/or shear pressure in the range 100 kPa to 55 MPa, and wherein a cohesive failure across the bonded cured resin surface is accomplished by roughing the crosslinkable resin coated portion of the substrates by grit blasting, electrochemical etching, or laser ablation prior to bonding.

In addition, wherein the step of debonding further creates separable cured resin surfaces across the substrates and wherein the separable cured resin surfaces across the substrates are defined for rebonding when abutted and the compressive force and elevated temperature is reapplied, such that the rebonded cured resin surface possesses at least 4 wt % exchangeable sites within the crosslinks of the bonded cured resin surface.

In various embodiments, the crosslinkable resin may consist of crosslinkable aromatic polyester oligomers with molecular weights between 700 and 2500 g/mol and having a mixture of carboxylic acid and acetoxy functional end groups. Alternatively, the crosslinkable resin may be deposited onto another polymer matrix composite. In yet other embodiments, the substrate is an induction heatable material and the requisite elevated temperature, ranged between 150° C. and 420° C., is supplied by an induction heating source.

In yet other embodiments, there may be a heating element embedded within the crosslinkable resin coated portion of the substrates and the requisite elevated temperature, ranged between 150° C. and 420° C., is produced by resistive heating by current passed through the heating element. In yet other embodiments, there may be a heating element embedded within the coated layer and the requisite elevated temperature, ranged between 150° C. and 420° C., is produced by resistive heating by current passed through the heating element.

In other embodiments, conductive fillers such as graphene nanoplatelets, milled carbon fiber, carbon nanotubes, silver microspheres, copper microspheres, carbon black, metallic whiskers are blended with the crosslinkable resin prior to depositing onto substrates. In these embodiments, the elevated temperature for adhesive bonding, ranged between 150° C. and 420° C., is supplied through Joule heating by current passed through the conductively conductive fillers or is supplied through microwave heating as produced by an applied microwave field. In addition, the elevated temperature may be produced by frictional forces between the coatings such as those generated by ultrasonic oscillations or rotational frictional welding.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the sprint and scope of the invention.

The invention claimed is:

1. A method of adhesive bonding comprising:
preparing a crosslinkable resin depositable by electrostatic powder deposition, and wherein the crosslinkable resin possesses exchangeable bonds within the crosslinkable resin after curing;
depositing the crosslinkable resin by electrostatic powder deposition onto two separate substrates to define crosslinkable resin coated portions of the two separate substrates, and wherein the two separate substrates are either metallic substrates, a polymer matrix composite substrate or a combination of the two;
fully curing the two separate substrates separately with the crosslinkable resin coated portions to create adhesive bonding of the crosslinkable resin coated portions to its corresponding separate substrate, thereby defining two fully cured crosslinkable resin surfaces each with a separate substrate;
abutting the two fully cured crosslinkable resin surfaces to each other;
causing interchain transesterification reaction bonds across the two fully cured crosslinkable resin surfaces by applying a compressive pressure in the range 100 kPa to 20 MPa at an elevated temperature in the range of 150° C. to 420° C. to create dynamic covalent crosslink bonds across the abutted two fully cured crosslinkable resin surfaces thereby creating a cohesive bonded cured resin surface region between the two fully cured crosslinkable resin surfaces that adhesively bond to the two separate substrates together, and wherein the cohesive bonded cured resin surface possesses at least 4 wt % exchangeable sites within the crosslinks of the bonded cured resin surface;
debonding the bonded cured resin surface by tensile and/or shear pressure in the range 100 kPa to 55 MPa, causing an at least a 90% cohesive failure across the cohesive bonded cured resin surface thereby maintaining an at least 90% adhesion of the bonded cured resin surfaces to the separate substrates and wherein the step of debonding further creates separable cured resin surfaces across the substrates; and
rebonding the separable cured resin surfaces across the substrates by re-abutting and reapplying a compressive force and elevated temperature, such that the separable cured resin surfaces rebond and possess at least 4 wt % exchangeable sites within the crosslinks of the bonded cured resin surface.

2. The method of claim 1, wherein conductive fillers, include but are not limited to, graphene nanoplatelets, milled carbon fiber, carbon nanotubes, silver microspheres, copper microspheres, carbon black, metallic whiskers are blended with the crosslinkable resin prior to depositing onto substrates.

3. The method of claim 2, wherein the elevated temperature for adhesive bonding, ranged between 150° C. and 420° C., is supplied through microwave heating as produced by an applied microwave field.

4. The method of claim 2, wherein the elevated temperature for adhesive bonding, ranged between ranged between 150° C. and 420° C., is supplied through Joule heating by current passed through the conductive fillers.

5. The method of claim 1, wherein the crosslinkable resin consists of crosslinkable aromatic polyester oligomers with molecular weights between 700 and 2500 g/mol and having a mixture of carboxylic acid and acetoxy functional end groups.

6. The method of claim 1, further comprising a step of roughening the two separate substrates prior to depositing the crosslinkable resin, and wherein the roughening is accomplished by sandblasting, electrochemical etching, or laser ablation.

7. The method of claim 1, wherein the two separate substrates are an induction heatable material and the requisite elevated temperature, ranged between 150° C. and 420° C., is supplied via an induction heating source.

8. The method of claim 1, wherein there is a heating element embedded within one or both of the two separate substrates and the requisite elevated temperature, ranged between ranged between 150° C. and 420° C., is produced by resistive heating by current passed through the heating element.

9. The method of claim 1, wherein there is a heating element embedded within the crosslinkable resin coated portions of the substrates and the requisite elevated temperature, ranged between 150° C. and 420° C., is produced by resistive heating by current passed through the heating element.

10. The method of claim 1, wherein the requisite elevated temperature is produced by frictional forces between the coatings, and wherein the frictional forces is generated by ultrasonic oscillations or rotational frictional welding.

11. A method of reversibly adhesive bonding comprising:
preparing a crosslinkable resin depositable by electrostatic powder deposition, and wherein the crosslinkable resin possesses exchangeable bonds within the crosslinkable resin after curing;
depositing the crosslinkable resin by electrostatic powder deposition onto two separate metallic substrates to define crosslinkable resin coated portions of the two separate substrates, and wherein the two separate metallic substrates are pretreated by roughing surfaces of the two separate metallic substrates by grit blasting, electrochemical etching, or laser ablation and then fully curing the two separate metallic substrates;
abutting the crosslinkable resin coated portions of the two separate substrates to each other and applying a compressive force in the range 100 kPa to 20 MPa at an elevated temperature in the range of 150° C. to 420° C. such that the crosslinkable resin coated portions of the two separate substrates crosslink with each other across the crosslinkable resin coated portions of the two separate metallic substrates to create a cohesive bonded cured resin surface between the two separate metallic substrates and adhesively bonding the cured resin surfaces between the crosslinkable resin and the separate metallic substrates thereby bonding the two separate metallic substrates together; and
wherein the cohesive bonded cured resin surface possesses at least 4 wt % exchangeable sites within the crosslinks of the bonded cured resin surface;
debonding the bonded cured resin surface by tensile and/or shear pressure in the range 100 kPa to 55 MPa, causing an at least a 90% cohesive failure across the cohesive bonded cured resin surface thereby maintaining an at least 90% adhesion of the bonded cured resin surfaces to the separate substrates, and wherein the step of debonding further creates separable cured resin surfaces across the separate substrates; and
rebonding the separable cured resin surfaces across the separate substrates by abutting and applying a compressive force and elevated temperature to create a cohesive rebonded cured resin surface, and the rebonded cured resin surface possessing at least 4 wt % exchangeable sites within the crosslinks of the rebonded cured resin surface, and wherein the rebonded cured resin surface is configured for repeating debonding and rebonding.

12. The method of claim 11, wherein conductive fillers, including but not limited to, graphene nanoplatelets, milled carbon fiber, carbon nanotubes, silver microspheres, copper microspheres, carbon black, metallic whiskers are blended with the crosslinkable resin prior to depositing onto substrates.

13. The method of claim 12, wherein the elevated temperature for reversibly adhesive bonding, ranged between 150° C. and 420° C., is supplied through Joule heating by current passed through the conductive fillers.

14. The method of claim 12, wherein the elevated temperature for reversibly adhesive bonding, ranged between ranged between 150° C. and 420° C., is supplied through microwave heating as produced by an applied microwave field.

15. The method of claim 11, wherein the crosslinkable resin consists of crosslinkable aromatic polyester oligomers with molecular weights between 700 and 2500 g/mol and having a mixture of carboxylic acid and acetoxy functional end groups.

16. The method of claim 11, wherein the two separate metallic substrates are an induction heatable material and the requisite elevated temperature, ranged between 150° C. and 420° C., is supplied via an induction heating source.

17. The method of claim 11, wherein there is a heating element embedded within the crosslinkable resin coated portions of the substrates and the requisite elevated temperature, ranged between 150° C. and 420° C., is produced by resistive heating by current passed through the heating element.

18. The method of claim 11, wherein the elevated temperature is produced by frictional forces between the coatings, and wherein the frictional forces are generated by ultrasonic oscillations or rotational frictional welding.

* * * * *